US007891315B2

(12) United States Patent
Barbezat

(10) Patent No.: US 7,891,315 B2
(45) Date of Patent: Feb. 22, 2011

(54) POWDER SUPPLY SYSTEM

(75) Inventor: Gérard Barbezat, Winterthur (CH)

(73) Assignee: Sulzer Metco AG, Wohlen (CH)

( * ) Notice: Subject to any disclaimer, the term of this patent is extended or adjusted under 35 U.S.C. 154(b) by 834 days.

(21) Appl. No.: 11/508,385

(22) Filed: Aug. 22, 2006

(65) Prior Publication Data

US 2007/0056509 A1 Mar. 15, 2007

(30) Foreign Application Priority Data

Sep. 9, 2005 (EP) ................................ 05405533

(51) Int. Cl.
*B05B 7/16* (2006.01)
*B05B 1/24* (2006.01)
*B05C 19/00* (2006.01)
*B65G 53/66* (2006.01)
*B67D 7/08* (2010.01)

(52) U.S. Cl. ......................... 118/302; 118/308; 406/14; 239/71; 239/79

(58) Field of Classification Search ................. 118/302, 118/308, 309, 684; 239/71, 79, 135, 195, 239/630; 406/14, 19, 30, 31; 177/116–120
See application file for complete search history.

(56) References Cited

U.S. PATENT DOCUMENTS 3,501,097 A * 3/1970 Daley .......................... 239/85
4,613,259 A 9/1986 Packer et al.
5,335,828 A 8/1994 Kaiju et al.
6,015,095 A 1/2000 Baioff et al.
2002/0020461 A1 2/2002 Platsch
2004/0191005 A1 * 9/2004 Kia et al. ....................... 406/46

FOREIGN PATENT DOCUMENTS

DE 33 10 663 A1 10/1984
DE 36 15 841 C1 8/1987
EP 0 578 332 A2 1/1994
EP 0 578 332 A3 1/1994
EP 0 940 189 A2 9/1999
EP 0 940 189 A3 9/1999
FR 2 720 663 A1 12/1995

* cited by examiner

*Primary Examiner*—Yewebdar T Tadesse
(74) *Attorney, Agent, or Firm*—Kilpatrick Townsend & Stockton LLP

(57) ABSTRACT

The invention relates to a powder supply system (1) for supplying a processing apparatus (2) with a granular substance (3). In this arrangement the powder supply system (1) includes a main container (4) and a powder conveying system (5) with a storage container (51) for conveying the granular substance (3) into the processing apparatus (2). In accordance with the invention, means (6, 611, 612, 62) are provided so that, in the operating state of the processing apparatus (2), a predetermined amount of the granular substance (3) can be conveyed from the main container (4) as working powder to the storage container (51) in such a way that at least a minimum amount (M1) is available as a granular substance (3) in the storage container (51).

16 Claims, 1 Drawing Sheet

POWDER SUPPLY SYSTEM

BACKGROUND OF THE INVENTION

Figure 1:
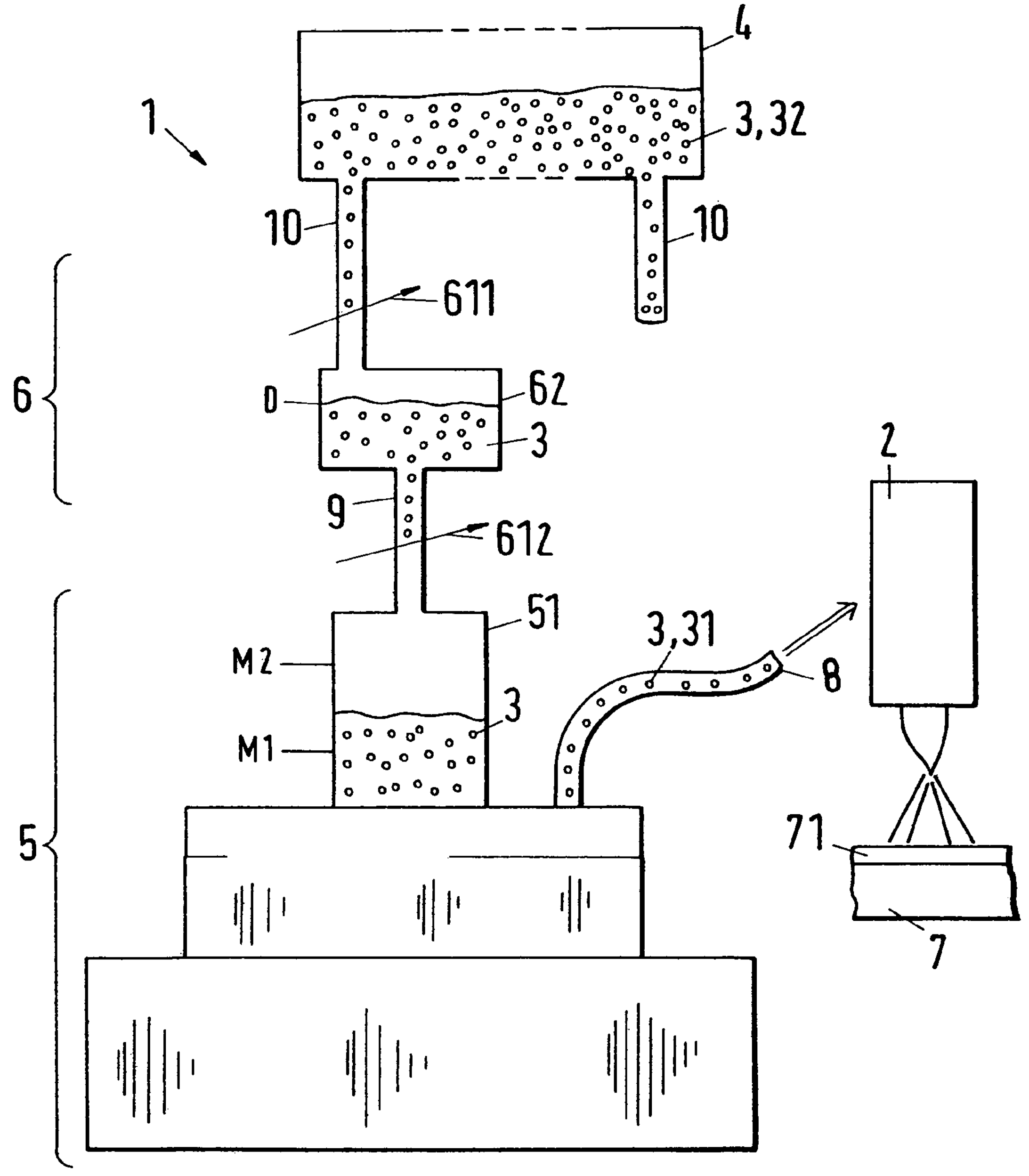

The invention relates to a powder supply system, a spray system and an apparatus for the surface treatment of a workpiece in accordance with the pre-characterising part of the independent claim in the respective category.

Powder processing apparatuses of the most diverse kinds, which have to be supplied in the operating state with powdery materials such as spray powders or minerals, such as sand and granulates for example, which can consist of the most diverse materials, include, as a rule, a powder supply system, which essentially consists of a powder feed system using the powder from a storage container, in which a certain amount of the required powder can be stored as a reserve, and which can be fed to the powder processing apparatus.

In industrial practice the previously mentioned powder processing apparatus can, for example, be thermal spraying apparatus such as plasma pistols, cold gas spraying systems, or the diverse well-known flame spraying and arc spraying systems (in which, for example, in addition to a spraying wire, powder is also processed) or other spraying systems processing powder, with which, for example, the surfaces of workpieces can be upgraded. An example of other powder processing apparatuses is apparatus for the surface treatment of workpieces, for example for the abrasive, roughening or polishing treatment of a surface of a workpiece by means of a blasting material, for example by means of minerals such as sand, fine dust or of a metallic, ceramic or synthetic blasting material.

The problem with all of these powder processing apparatuses named as an example and known from the prior art is that they have conventional powder feed systems, the storage containers of which are of limited capacity for the corresponding powder or blasting material. In the case of thermal spraying systems this capacity is, as a rule, a maximum volume of 7 liters. This is a considerable obstacle for mass production in particular when parts are to be manufactured in very large numbers in series, for example have to be provided with a thermally sprayed layer, or if the surfaces of workpieces have to be treated with a blasting material by means of blasting.

In mass production the processes, for example the coating of workpieces, have to be halted at regular intervals relatively often in order to reload the storage containers. This results in considerable time delays, and moreover can only be achieved with difficulty.

Moreover, the quality of the process is not completely independent of the filling level of the storage container. Thus it can be advantageous during thermal spraying, depending on the spraying method, and/or on the spraying material and/or on the quality required of the layer to be sprayed, that the filling level in the storage container only changes between a predetermined maximum and a minimum value, since the concrete filling state also has an effect on the powder supply rate, so that a higher and/or a lower filling level can have a negative effect on the quality of a layer to be sprayed.

SUMMARY OF THE INVENTION

An object of the present invention is therefore to make available a new powder supply system which avoids the disadvantages of the prior art and with which in particular a specific automated refilling of the storage container is made possible without the operation of the apparatus to be supplied with powder having to be interrupted, wherein at the same time ideal working results of the apparatus processing the powder are guaranteed.

The subject matter of the invention satisfying these objects is characterised by the features of the independent claims.

The dependent claims relate to particularly advantageous embodiments of the invention.

Thus the invention relates to a powder supply system for the supply of a processing apparatus with a granular substance. The powder supply system in this arrangement includes a main container and a powder supply system with a storage container for conveying of the granular substance into the processing apparatus. In accordance with the invention means are provided so that in the operating state of the processing apparatus a pre-determinable amount of the granular substance can be supplied to the storage container from the main container as working powder in such a manner that at least a minimum amount of granular substance is available in the storage container.

An important feature of the invention is thus that in the operating state of the processing apparatus the storage container can be refilled with a pre-determinable amount of granular substance, in other words with powder or a blasting material, and what is more, without a current processing operation, for example a coating procedure which is in progress from a processing apparatus equipped with a thermal spraying apparatus, having to be interrupted. Thus, in cases of a series manufacture or in mass production of a very large number of workpieces, very long service lives are achieved without the production procedure having to be interrupted. Thus a coating unit for the thermal coating of a component can be operated for a week or more without interruption for example, without the procedure of the coating of the components having to be interrupted for refilling of the storage container. Since it is also possible to automatically refill the main container from which the storage container is fed at specific intervals, a powder supply system equipped in this way can be operated without interruption until the coating of a pre-determinable number of workpieces has been completed or until, for example, necessary servicing or a defect which arises enforces an interruption of the running process.

A further important point is that the amount of powder in the storage container never falls below a minimum amount of granular substance; i.e. it is guaranteed that the amount of spray powder or blasting material in the storage container, for example during a complete procedure, always has at least a certain filling level and, on the other hand, a certain pre-determinable maximum filling level or filling quantity of the storage container is never exceeded, since only a pre-determinable limited amount of granular substance is refilled into the storage container, so that in total the filling level or the filling quantity in the storage container always lies within a pre-determinable range.

This is important, particularly if the filling level of the storage container has an influence on the quality of the product which is manufactured by the processing apparatus or which is processed by the processing apparatus. Thus, in certain cases, it is possible that the filling level in the storage container has an influence on the quality of a thermally sprayed layer which is applied to a workpiece from a thermal spray pistol, which is fed with spray powder from the storage container. In a case like this it is absolutely essential that the filling quantity or the filling level always lies in a predetermined range. This means that the amount of spray powder in the storage container, for example, is allowed to vary at the most between a minimum and a maximum value, if the quality of a layer to be sprayed is not going to be negatively influenced. The control or the regulation of the amount of granular substance stored in the storage container is thus possible for the first time by means of the powder supply system in accordance with the invention.

In a preferred embodiment a metering means is provided, in particular a valve for metering a pre-determinable dose of granular substance. By this means the pre-determinable amount of granular substance, which has to be fed to the storage container from the main container on reaching a pre-determinable minimum filling level in the storage container, for example, is controlled or regulated.

In a particularly preferred embodiment, a metering container can be provided between the main container and the storage container for accepting the dose of the granular substance. This means that, before it is fed to the storage container, a certain pre-determinable amount of granular substance, for example of a spray powder, is initially transferred into the metering container from where the thus measured dose is then passed further into the storage container. This has the particular advantage that a working pressure under which the predetermined dose of granular substance is brought into the storage container during a filling procedure is the same in every filling procedure and can be maintained in pre-determinable load limits, so that the delivery of the processing apparatus with granular substance takes place completely evenly and without breakdown even during a filling procedure of the storage container.

In this arrangement a filling level meter for measuring the amount of granular substance is preferably provided at the main container and/or at the storage container and/or at the metering container.

A refilling of the storage container during the current procedure, for example during current coating of a workpiece, can then take place as follows for example: a measurement device for the filling level is not only present in the storage container, but also at the metering container, which controls the filling level of granular substance, in other words of spray powder. The measurement devices for filling levels are connected signal-wise to a control and/or regulation unit, which can include an electronic data processing unit and which can simultaneously control and/or regulate the opening and closing of respectively one valve between a main container loaded with a large store of spray powder for example and the metering container and also of a second valve between the metering container and the storage container. The measurement device for the filling level can, for example, be an optical measurement device, an acoustical measurement device, in particular an ultrasonic measurement device for the filling level, a mechanical measurement device for the filling level or another suitable measurement device for the filling level.

At first an adequate amount of spray powder or blasting material is present in the storage container for example. A pre-determinable amount of granular substance is contained in the metering container, which is intended to be added to the storage container on reaching a minimum filling level in the storage container. The two valves between the main container and the metering container and between the metering container and the supply container are closed.

If the measuring device for the filling level at the storage container shows that the amount of spray powder in the storage container has reached a pre-determinable minimum filling level, a corresponding signal is transmitted to the data processing unit which then opens the valve between the metering container and the storage container automatically, so that the dose of granular substance stored in the storage container reaches the storage container and this is refilled again up to the maximum filling level, so that a continuous process can be continued without interruption. Then the valve between the metering container and the storage container is closed again automatically. Thereafter the valve between the main container and the metering container is opened, so that the metering container is refilled with the predetermined dose of granular substance from the main container. If the measuring device for the filling level in the metering container detects that the metering container has been refilled with the predetermined dose, the measuring device for the filling level gives a corresponding signal to the data processing unit of the control and/or regulating unit, which then closes the valve between the main container and the metering container again.

Subsequently a further filling of the storage container can be undertaken anew, as described in the above.

It goes without saying that in a special embodiment of a powder supply system in accordance with the invention at least a second main container can be provided with a second granular substance, so that for example a composition of the working powder, with which a surface of a workpiece can, for example, be coated by means of a thermal spraying apparatus, can be altered in the operating state of the processing apparatus. This means a separate metering container can be provided, either for each main container or for certain main containers, which are all connected to the storage container. In another example only one metering container is provided for two or more main containers and is filled with the different or same granular substances out of the different main containers in correspondence with a predetermined mixing ratio and is connected to the storage container in order to feed it via a valve.

In this arrangement in a special case, care is to be taken, in particular, that the mixture of the different materials or powders takes place as homogeneously as possible. In another special example it can, in contrast, be advantageous if only a first granular substance is initially introduced into the metering container from a first main container and subsequently only a second substance is introduced into the metering container from a second main container, i.e. quasi layer-wise. In this way it is possible to automatically spray two different layers one after the other onto different workpieces with a single dose or, for example, if a complete layered dose is sufficient for exactly one workpiece, to coat a workpiece with two different layers one after the other.

In this arrangement it goes without saying that all the embodiments of the powder supply systems in accordance with the invention described by way of example in this application can also be combined in a suitable manner.

As has already been mentioned, the granular substance can include a powder, in particular a spray powder or a thermal spray powder, especially a thermal spray powder including a metal and/or a metallic alloy and/or a ceramic material, in particular $Al_2O_3$, $Cr_2O_3$, $TiO_2$, $ZrO_2$ and/or a carbide, in particular WC, $Cr_3C_2$, TiC, TaC, $Fe_3C$, diamond niobium carbide, vanadium carbide and/or a boride and/or a nitride, in particular cBN or hBN and/or a synthetic material and/or any other suitable material. All suitable combinations of the afore-named materials can also be used advantageously.

It is also self-evident that the granular substance can also be a blasting material, in particular sand, a ceramic and/or metallic blasting powder and/or a fine dust for abrasive and/or roughening and/or polishing blasting of a surface of a workpiece.

The use of a powder supply system in accordance with the invention is thus not limited to a certain class of granular substances.

A mean value of the size of a particle of the granular substance lies between 1 μm and 200 μm, preferably between 10 μm and 200 μm, especially between 5 μm and 80 μm. It goes without saying that much finer particles and considerably coarser particles, for example with diameters in the millimeter range or even larger, can also be successfully used in special embodiments of the powder supply systems in accordance with the invention.

If the granular substance is a substance, which includes particularly small particles, for example particles which are approximately 1 μm or smaller, then the granular substance can also be present in the main container as a mixture with a fluid, for example in a mixture with water, an organic liquid, such as for example alcohol, in particular in the form of a so-called slurry. Then, but not only in that case, but rather in general, the metering means of a powder supply system in accordance with the invention can also include suitable pumps and the processing apparatus is, for example, a polishing apparatus for polishing wafers in micro-technology or another apparatus for polishing or processing of other, in particular highly sensitive, surfaces.

For the support, optimising or improving of the conveying of the granular substance in the powder supply system, or for the support, optimising or improvement of another process parameter, the main container and/or the second main container and/or the metering container and/or the powder conveying system, in particular the storage container and/or the processing apparatus, can be charged with a gas, especially with a noble gas, such as argon or helium or with oxygen, nitrogen or another process gas, preferably with an overpressure in the operating state.

The invention further relates to a spraying system for spraying a layer on a surface of a workpiece, in particular a cold gas spraying system or a thermal spraying system, especially a flame spraying system with spraying wire and/or spray powder, a plasma spraying system with spraying wire and/or spray powder, an arc spraying system with spraying wire and/or spray powder, a flame detonation spraying system, or an HVOF spraying system including a powder supply system as described above.

Furthermore, the invention also relates to an apparatus for the surface treatment of a workpiece, in particular for the abrasive and/or roughening and/or polishing or blasting treatment, especially for the blasting of bore walls, for example for the blasting of the bore walls of the cylinders of a reciprocating piston combustion engine with a powder supply system as described above in different embodiments by way of example.

BRIEF DESCRIPTION OF THE INVENTION

The invention will be described more closely with the help of the following schematic drawing.

FIG. 1 shows a powder supply system in accordance with the invention with a thermal spray apparatus.

DESCRIPTION OF THE PREFERRED EMBODIMENTS

FIG. 1 shows a schematic illustration of a powder supply system in accordance with the invention, which is referred to throughout the following with the reference numeral 1.

The powder supply system 1 includes a powder processing apparatus 2, which in the present example is a plasma spray pistol 2 for coating a surface of a workpiece 7. The plasma spray pistol 2 is supplied via a line 8 with the spray powder 3, which serves the plasma spray pistol 2 as a working powder 31 for the building up of a surface layer 71 on the workpiece 7. In this arrangement the powder conveying system 5 includes a storage container 51 for accepting a certain stored quantity of spray powder 3. In the present example of FIG. 1 the store of spray powder 3 may not fall below a filling level M1 in the storage container 51 and the filling level also may not exceed an upper level M2. The storage container 51 is connected to a metering container 62 via a connection line 9, so that a dose D of spray powder 3 can be fed out of the metering container 62 to the storage container 51, as soon as the filling level reaches the lower mark M1 in the storage container 51. A valve 612 is provided in the feed line 9 between the storage container 51 and the metering container 62, so that the feed of spray powder 3 from the metering container into the storage container 51 can be released or stopped.

The metering container 62 is for its part fed from the main container 4 with a dose D of spray powder 3 via a powder line 10, after the metering container 62 has released its dose D into the storage container 51. A further valve 611 is provided in the line 10 between the main container 4 and the metering container 62 for separating or establishing a connection of the main container 4 to the metering container 62.

At least the valves 611, 612 and the measurement device for the filling level (which is not explicitly illustrated in FIG. 1), which are preferably provided at least at the metering container 62 and at the storage container 51, are connected by signals with a control and/or regulation unit for actuation of the valves 611, 612 which is likewise not illustrated in FIG. 1. In this arrangement the control and/or regulation unit preferably includes a data processing unit which evaluates the corresponding signals of the measuring devices for the filling level and accordingly actuates the valves 611, 612, i.e. which opens or closes the valves at the right time and in the right order, as was explained in detail for example in the above in the description of a refilling procedure for refilling the storage container 51. It will be understood that the previously mentioned control and/or regulation unit can also control and/or regulate further components of the powder supply system 1 and/or of the processing apparatus 2 and/or of further relevant components, for example of a coating system.

As can be inferred from FIG. 1, a further line 10 is provided at the main container 4 which is connected to a further, not illustrated, metering unit 62 for the filling with powder 3, which for example supplies a second storage container 51 of a second powder supply system 5 with spray powder 3, to which a different processing apparatus 2, for example a further plasma spray pistol 2, can be attached, so that two workpieces 7 can be provided with a surface layer 71 simultaneously by means of thermal spraying.

It is also possible for one and the same powder conveying system 5 to supply two like or different processing apparatuses 2 with granular substance simultaneously. Thus, for example, one and the same powder conveying system 5 can supply two or more plasma spray pistols with powder simultaneously or can also simultaneously supply two or more different thermal spray systems with powder.

The invention claimed is:

1. A powder supply system for supplying a processing apparatus with a granular substance, including a first main container and a powder conveying system with a storage container for conveying the granular substance into the processing apparatus, wherein a regulation unit is configured to control a first valve between the first main container and the storage container so that, in the operating state of the processing apparatus, a predetermined amount of the granular substance can be conveyed by actuation of the first valve to the storage container out of the first main container as working powder in such a way that at least a minimum amount is available as granular substance in the storage container, wherein the regulation unit is configured to actuate the first valve such that a predetermined amount of the granular substance does not exceed a maximum amount such that a level of the granular substance within the storage container always lies in a predetermined range between an empty level and a full level of the storage container, and wherein the regulation unit is configured to provide a first dose of the predetermined amount of the granular substance to the storage container by opening the first valve in response to a signal provided to the regulation unit from a measuring device of the storage container that the level is at the minimum amount and by closing the first valve in response to a signal provided to the regulation unit that the level is at the maximum amount which is below the full level of the storage container, wherein a metering container is provided between the first main container and the storage container for accepting doses of the pre-determined amount of the granular substance via a second valve between the first main container and the metering container and for delivering the doses of the pre-determined amount of the granular substance to the storage container, wherein the regulation unit is configured to actuate the second valve to provide the metering container with a second dose of the pre-determined amount of the granular substance from the first main container after the regulation unit has closed the first valve in response to the regulation unit detecting that the first dose of the pre-determined amount of the granular substance has been delivered to the storage container from the metering container.

2. A powder supply system in accordance with claim 1, wherein the first and second valves are provided for the metering of a predetermined dose of granular substance.

3. A powder supply system in accordance with claim 1, wherein the measuring device is provided for the filling level at the first main container and/or at the storage container and/or at the metering container for determining the amount of granular substance.

4. A powder supply system in accordance with claim 3, wherein the measuring device comprises an ultrasound measurement device.

5. A powder supply system in accordance with claim 1, wherein at least a second main container with a second granular substance is provided, so that a composition of the working powder can be altered in the operating state of the processing apparatus.

6. A powder supply system in accordance with claim 5, wherein the at least second main container is connected to a second metering container by a third valve, the second metering container being connected to the storage container by a fourth valve.

7. A powder supply system in accordance with claim 6, wherein the regulation unit is further configured to provide a layered dose of the granular substance and the second granular substance to the storage container by opening the first valve and the fourth valve in an alternating manner in response to a signal provided to the regulation unit from a measuring device of the storage container that the level is at the minimum amount and by closing the first valve and the fourth valve in response to a signal provided to the regulation unit that the level is at the maximum amount which is below the full level of the storage container.

8. A powder supply system in accordance with claim 6, wherein the regulation unit is further configured to provide a mixed dose of the granular substance and the second granular substance to the storage container by opening the first valve and the fourth valve in response to a signal provided to the regulation unit from a measuring device of the storage container that the level is at the minimum amount and by closing the first valve and the fourth valve in response to a signal provided to the regulation unit that the level is at the maximum amount which is below the full level of the storage container.

9. A powder supply system in accordance with claim 5, wherein the at least second main container is connected to the metering container by a third valve.

10. A powder supply system in accordance with claim 9, wherein the regulation unit is further configured to provide a mixed dose of the granular substance and the second granular substance to the metering container by opening the second valve and the third valve.

11. A powder supply system in accordance with claim 1, wherein the granular substance includes a spray powder or a thermal spray powder including Al203, Cr203, TiO2, ZrO2 and/or WC, Cr3C2, TiC, TaC, Fe3C, diamond, niobium carbide, vanadium carbide and/or cBN or hBN and/or a synthetic material and/or a combination of these materials and/or wherein the granular substance is a blasting sand, ceramic and/or metallic blasting powder and/or fine dust for the abrasive and/or roughening and/or polishing blasting of a surface of a workpiece.

12. A powder supply system in accordance with claim 1, wherein a mean value of the size of a particle of the granular substance lies between 1 μm and 200 μm, or between 10 μm and 200 μm, or between 5 μm and 80 μm.

13. A powder supply system in accordance with claim 1, wherein the first main container and/or a second main container and/or the metering container and/or the storage container and/or the processing apparatus can be charged with argon or helium or with oxygen, nitrogen or another process gas with an overpressure.

14. A powder supply system in accordance with claim 1, wherein the granular substance is suspended in a liquid and forms a slurry.

15. A powder supply system in accordance with claim 14, wherein a pump is used to convey the slurry into the processing apparatus.

16. A spray system for spraying a layer on the surface of a workpiece in accordance with claim 1, comprising: a cold gas spraying system, a thermal spraying system, a flame spraying system with spraying wire and/or spray powder, a plasma spraying system with spraying wire and/or spray powder, an arc spraying system with spraying wire and/or spray powder, a flame detonation spraying system, an HVOF spraying system, and/or an apparatus for abrasive and/or roughening and/or polishing blasting.

* * * * *